United States Patent [19]

Hawker

[11] 4,285,364
[45] Aug. 25, 1981

[54] HOSE COUPLING

[75] Inventor: Michael J. Hawker, Lincoln, England

[73] Assignee: Clayton Dewandre Co. Ltd., Lincoln, England

[21] Appl. No.: 151,910

[22] Filed: May 21, 1980

Related U.S. Application Data

[63] Continuation of Ser. No. 966,209, Dec. 4, 1978, abandoned.

[51] Int. Cl.³ .............................................. F16L 37/28
[52] U.S. Cl. .............................. 137/614.03; 251/149.8
[58] Field of Search .................. 137/614.02, 614.03, 137/614.04, 614.06; 251/149.8, 149.9

[56] References Cited

U.S. PATENT DOCUMENTS

| 2,637,572 | 5/1953 | Bruce | 137/614.02 |
| 2,854,259 | 9/1958 | Clark | 137/614.03 |
| 3,123,099 | 3/1964 | Brevning et al. | 137/614.06 |
| 3,211,178 | 10/1965 | Kiszko | 137/614.04 |
| 3,224,728 | 12/1965 | Buseth et al. | 137/614.03 |
| 3,608,582 | 9/1971 | Lambert | 137/614.02 X |
| 3,613,726 | 10/1971 | Torres | 137/614.03 |
| 3,674,051 | 7/1972 | Stratman | 137/614.04 |
| 4,086,939 | 5/1978 | Wilcox et al. | 137/614.03 |

FOREIGN PATENT DOCUMENTS

| 616242 | 3/1961 | Canada | 137/614.03 |
| 1316054 | 2/1962 | France | 137/614.03 |

Primary Examiner—Martin P. Schwadron
Assistant Examiner—A. Michael Chambers
Attorney, Agent, or Firm—Woodard, Weikart, Emhardt & Naughton

[57] ABSTRACT

A hose coupling for tractor-trailer braking systems which produce sealed hydraulic connections even in high pressure circuits, with minimum fluid loss on coupling and de-coupling. The coupling comprise male and female members which when brought together displace a sleeve along the spigot portion of the female member and simultaneously displace a plug along the bore of the male member to uncover sets of radial ports communicating respectively with supply and return passages to establish hydraulic flow and return paths through the coupling. The coupling also has means for locking the two members together.

9 Claims, 3 Drawing Figures

HOSE COUPLING

This is a continuation of application Ser. No. 966,209, filed Dec. 4, 1978, now abandoned.

This invention relates to hose couplings and has particular, but not exclusive, reference to couplings embodying supply and return lines and for use with powered hydraulic circuits such, for example, as tractor to trailer connections in powered hydraulic braking systems, the main object of the invention being the provision of a coupling which will satisfactorily establish a sealed hydraulic connection even in circuits at high pressure with minimum fluid loss on connection and disconnection.

According to the invention, a h ose coupling for the purpose mentioned comprises a female coupling member including a tubular body open at one end and having a rigid axially-disposed spigot portion, supply and return passages in the spigot portion and leading to radial ports in the periphery thereof and of which the return port is disposed outwardly of the supply port, and a sleeve sliding on said spigot portion and spring-urged to a position to mask said ports, and a complementary male coupling member adapted to enter the female coupling member and formed with an axial bore adapted to receive with a sealed sliding fit the spigot portion of the complementary coupling member, the said male coupling member being provided with supply and return passages leading to radial ports opening into said bore, with the supply port disposed outwardly of the return port and plug or spool slidable in said bore and spring urged into a position to mask said ports, the arrangement being such that when the two coupling members are brought together the sleeve is displaced along the spigot portion of the female member and simultaneously the plug is displaced along the bore of the male member whereby the respective sets of ports are uncovered and brought into coincidence to establish hydraulic flow and return paths through the coupling releasable means also being provided for locking the two coupling members together in their operative condition.

The relative disposition of the ports as above described is such that during manual disconnection or trailer break-away the supply port of the male coupling member and the sliding interfaces are swept by the return port of the female coupling member so ensuring zero pressure at these interfaces and minimizing oil loss and dribbling.

An embodiment of the invention will now be described by way of example with reference to the accompanying drawings of which:

Figure 1:
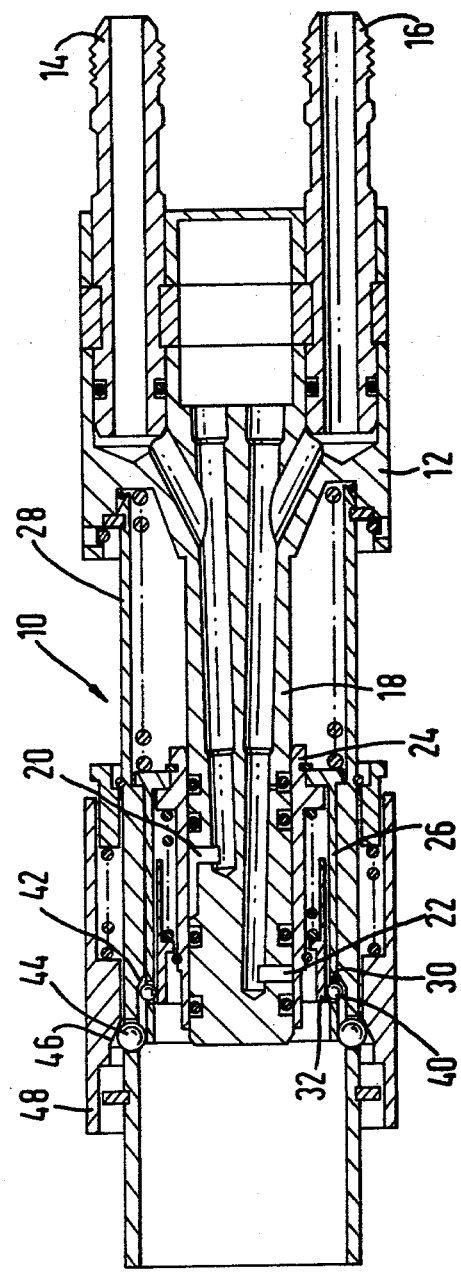
FIG. 1 is a cross-section of a female coupling member of a tractor-trailer brake line coupling.
Figure 2:
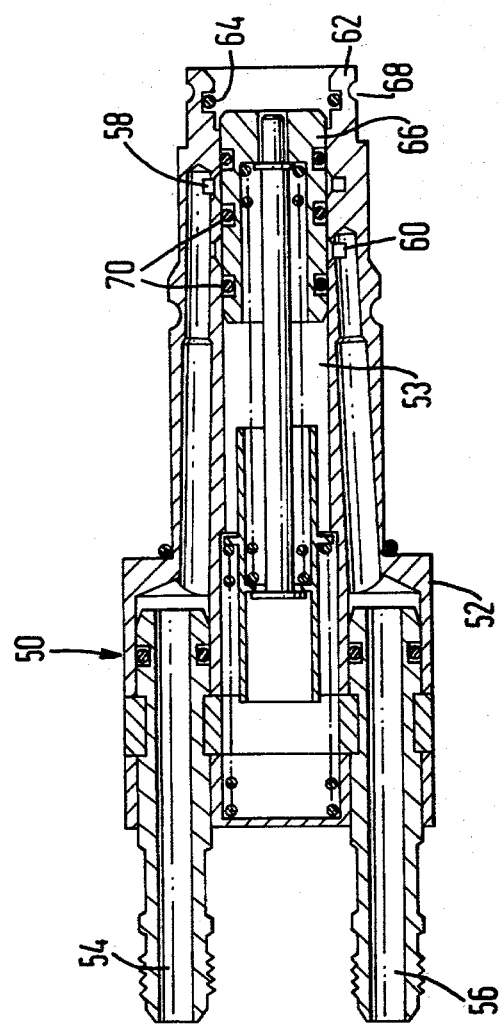
FIG. 2 is a cross-section of a male coupling member for the same coupling.
Figure 3:
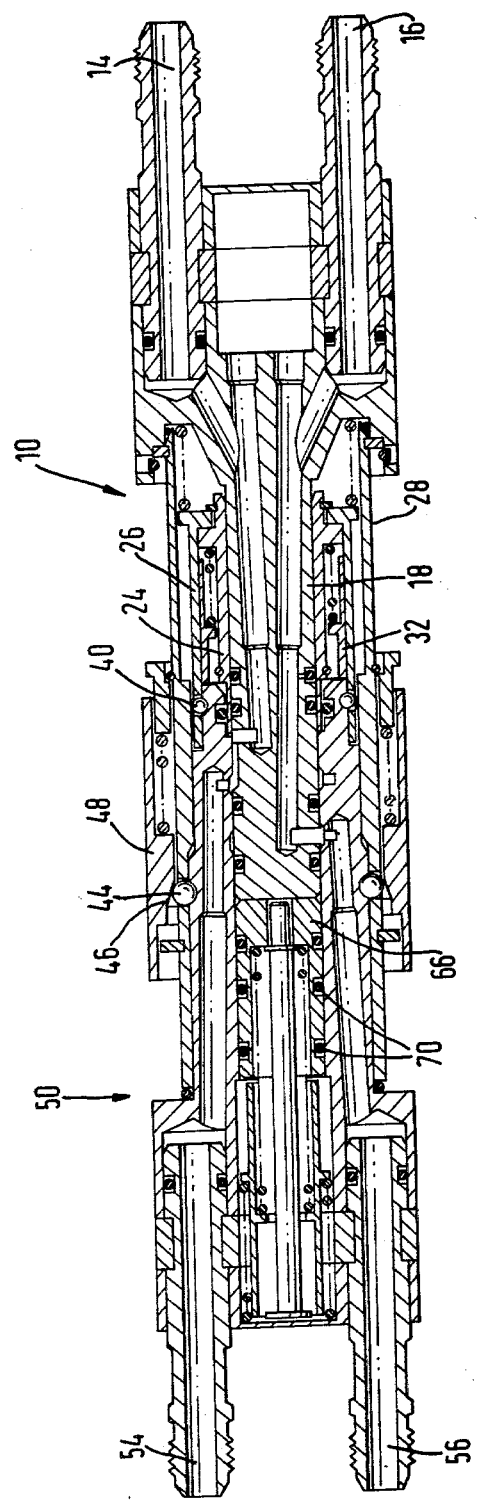
FIG. 3 is a cross-section of the male and female coupling members of FIGS. 1 and 2 assembled to form a tractor-trailer brake line coupling.

The female coupling member 10 is mounted on the tractor and comprises a body portion 12 incorporating diametrically-opposed and axially-extending supply 14 and return 16 passages which in use are connected to the corresponding lines of a full power hydraulic braking system. The body portion 12 has a spigot-like axial extension 18, the said passages being carried into the extension and terminating in outwardly-directed radial ports 20 and 22 respectively opening to the periphery of the extension 18, the return port 22 being displaced outwardly of the supply port 20, that is, nearer to the free end of the extension. Mounted in sealed sliding engagement on the extension is an inner sleeve 24 having operative connection with a concentric outer sleeve 26, this sleeve assembly being spring-loaded towards an outward position where the inner sleeve masks the ports in the extension. Secured to the body portion is a tubular shell 28 which encloses the sleeve assembly, the said outer sleeve having a ring of radial openings 30 containing balls 40 or equivalent detents which co-act as hereafter described with a ramp surface 42 on the shell 28. There is also a spring-loaded lock sleeve 32 between said inner 24 and outer 26 sleeves operable to hold said detents 40 in a projected position for engagement by said ramp surface 42, while a further ring of balls or detents 44 in apertures in the shell 28 co-act with a similar ramp surface 46 on a spring-loaded and manually-displaceable release sleeve 48 encircling the shell 28.

The male coupling member 50 is adapted to be mounted in the trailer and comprises a tubular body portion 52 the bore 53 of which is of a diameter to receive with a sealed sliding fit the spigot portion 18 of the complementary coupling member 10, said male body portion 52 also having diametrically-opposed and axially-extending supply 54 and return 56 passages adapted to be connected into the trailer braking circuit, the passages terminating in radial ports 58 and 60 opening into said bore 53 with the supply port 58 located outwardly of the return port 60. The forward end of this coupling member 50 has an annular flange-like nose portion 62 having an outside diameter to fit closely within the outer sleeve 26 of the female coupling member 10, the inner face of said nose portion incorporating a ring seal 64 adapted to make sealed sliding engagement with the inner sleeve 24 of said female coupling member. A plug or spool 66 has a sealed sliding fit in the bore 53 of the male coupling member, being spring urged to a forward position where it masks the two radial ports 58 and 60 communicating with the supply and return passages 54 and 56.

In the de-coupled condition the inner ring of ball detents 40 is held in an outwardly-projected condition by the lock sleeve 32 whilst the outer ring of detents 44 is held in an inward or depressed condition by the external release sleeve 48.

On coupling the two members together the following sequence of operations occur: the initial entry of the male coupling member 50 into the complementary coupling member 10 positions the nose portion 62 of the male coupling member within the end of the outer sleeve 26 of the other coupling member and in engagement with the end of the lock sleeve 32. In this position the plug or spool 66 in the male coupling member abuts the outer end of the spigot portion 18 of the female coupling member 10. Further entry of the male component displaces the sleeve assembly inwards against the thrust of its loading spring and the inner ring of ball detents 40 is forced inwards by the ramp 42 on the shell 28 and into engagement with an annular groove 68 in the said nose portion 62 to lock the two components together. During this further movement, the plug or spool 66 in the bore of the male coupling member 56 is forced inwards to uncover the radial ports in that member, this movement coinciding with a displacement of the slide assembly in the female coupling member 10 to uncover the radial ports 20 and 22 in the spigot member 18 and, as the male component completes the inward movement, the two sets of radial ports are brought into coincidence to complete the hydraulic connection. At the same time, the release sleeve 48 is displaced against its return spring to permit the outer ring of detents 44 to move outwards and allow the male component 50 to reach a limited inward position when said ring of detents then engage an external groove in the male component. The release sleeve 48 is then returned to its initial position to lock the outer ring of detents 44 in their displaced position and so secure the two components firmly together. The reverse sequence of operations occur on de-coupling, emergency separation such as a trailer break-away, resulting in a separating force which by thrust of the outer ring of detents 44 against the ramp 46 of the release sleeve 48 displaces said sleeve and allows said detents 44 to move outwards to disconnect the two coupling members.

High pressure ring seals 70 are provided in the spigot portion 18 and in the plug or spool 66 at each side of and between the radial ports and co-act with complementary sliding surfaces such that any high pressure leakage of the fluid can only be to the return circuit. Also, the supply port 58 of the male component is swept by the return port 22 of the female component 10 during disconnection so ensuring that no pressure is retained in the trailer braking circuit.

Supply port 58 and return port 22 come into fluid communication during disengagement because supply port 58 extends annularly about the circumference of the bore of the male component, as can be seen from the drawings. This temporary fluid communication allows the pressure in the supply line of the trailer circuit (male component) to be bled into the return line of the full power braking system (female component).

The shell 28 may have a compliant anchorage with the component body to eliminate concentricity problems during connection, while the supply and return port connections are preferably rotatable to give freedom of hose movement. Finally, while the invention has been described in relation to couplings for high pressure hydraulic circuits, it will be understood that the coupling can equally be used for dual line connections in hydraulic circuits at zero pressure.

I claim:

1. A hose coupling for coupling and uncoupling between high pressure hydraulic system having a high pressure hydraulic source, and a hydraulic circuit that is pressure dependent upon the high pressure hydraulic source, said hose coupling comprising:
    (a) a female coupling member including a tubular body open at one end and having a rigid axially-disposed spigot portion, supply and return passages in the spigot portion and leading to radial ports in the periphery thereof, and a sleeve sliding on the spigot portion and biased to a position to close the ports of said female coupling member;
    (b) a complementary male coupling member adapted to enter the female coupling member, said male coupling member defining an axial bore which is adapted to receive with a sealed sliding fit the spigot portion of the female coupling member, the male coupling member also having supply and return passages leading to radial ports disposed radially inwardly toward the bore defined by said male coupling member and a plug or spool slidable in the bore and biased into a position to close the ports of said male coupling member;
    (c) the female and male members being cooperative such that when the two members are coupled together the sleeve is displaced along the spigot portion of the female member to uncover the supply and return ports of said female member, and simultaneously the plug is displaced along the bore of the male member to uncover the supply and return ports of said male member, with the supply and return ports of said female member cooperating with the corresponding ports of said male member in fluid communication to establish hydraulic flow and return paths through the coupling;
    (d) the supply passage of one of said coupling members being connected to the high pressure hydraulic source, the return port of said one coupling member being disposed outwardly of the supply port relative to the distal end of said one coupling member;
    (e) the supply port of said other coupling member being disposed outwardly of the return port of said other coupling member relative to the distal end of said other coupling member; and
    (f) releasable means for locking the two coupling members together in their operative condition.

2. The hose coupling of claim 1 in which said one member is said female member.

3. The hose coupling of claim 1 additionally including bleeding means for bleeding pressure from the pressure dependent hydraulic circuit upon disconnection of said coupling, said bleeding means including flow path means for providing, during disconnection from a coupled to an uncoupled state, for fluid communication between the radial supply port of said male member and the radial return port of said female member prior to complete disengagement.

4. The hose coupling of claim 3 in which said bleeding means includes said supply port of the other of said members being annular.

5. A hose coupling comprising a female coupling member including a tubular body open at one end and having a rigid axially-disposed spigot portion, supply and return passages in the spigot portion and leading to radial ports in the periphery thereof and of which the return port is disposed outwardly of the supply port relative to the distal end of said spigot, and a sleeve sliding on the spigot portion and biased to a position to close the ports of said female coupling member, and a complementary male coupling member adapted to enter the female coupling member, said male coupling member defining an axial bore which is adapted to receive with a sealed sliding fit the spigot portion of the female coupling member, the male coupling member also having supply and return passages leading to radial ports disposed radially inwardly toward the bore, defined by said male coupling member with the supply port disposed outwardly of the return port relative to the distal end of said male coupling member, and a plug or spool slidable in the bore and biased into a position to close the ports of said male coupling member, the arrangement being such that when the two members are coupled together the sleeve is displaced along the spigot portion of the female member to uncover the supply and return ports of said female member, and simultaneously the plug is displaced along the bore of the male member to uncover the supply and return ports of said male member, with the supply and return ports of said female member cooperating with the corresponding ports of said male member in fluid communication to establish hydraulic flow and return paths through the coupling, releasable means also being provided for locking the two coupling members together in their operative condition.

6. A hose coupling according to claim 5 additionally comprising flow path means for providing, during disconnection from a coupled to an uncoupled state, for fluid communication between the radial supply port of said male member and the radial return port of said female member prior to complete disengagement.

7. A hose coupling according to claim 5 or claim 6 wherein the sleeve forms part of an assembly biased toward the position in which the sleeve closes the ports and disposed within a tubular member surrounding the spigot portion, the assembly comprising a carrier for a ring of detents and within the carrier a locking sleeve displaceable by the male member when the coupling members are brought together, whereby the ring of detents co-operate with an interior portion of the tubular member to be pressed into engagement with a corresponding recess or recesses on the male member, and comprising a second ring of detents carried by the tube member and held by a release sleeve in engagement with another recess or recesses on the male member, to lock the coupling members together in their operative condition.

8. A hose couplings according to claim 7 wherein in each of said first and second rings of the detents comprise balls disposed in apertures in the wall of the associated carrier and wherein the balls in the first and second rings are supported respectively between the release sleeve and the carrier, and the tubular member and the locking sleeve, the balls being movable radially to engage their respective recess or recesses by internal ramps in the release sleeve and tubular member.

9. The hose coupling of claim 6 in which said flow path means includes said supply port of said male member extending annularly about the circumference of the bore of said male member.

* * * * *